United States Patent
Nakagawa et al.

[11] Patent Number: 5,880,562
[45] Date of Patent: Mar. 9, 1999

[54] FLUORESCENT LAMP LIGHTING APPARATUS

[75] Inventors: Hiroki Nakagawa, Takatsuki; Tetsuya Tahara, Kusatsu; Youji Tashiro, Takatsuki; Masataka Ozawa, Takarazuka, all of Japan

[73] Assignee: Matsushita Electric Industrial Co., Ltd., Kadoma, Japan

[21] Appl. No.: 889,637

[22] Filed: Jul. 8, 1997

[30] Foreign Application Priority Data

Jul. 12, 1996 [JP] Japan ..................... 8-183009
Jun. 27, 1997 [JP] Japan ..................... 9-172418

[51] Int. Cl.$^6$ ..................... H05B 37/02
[52] U.S. Cl. ............... 315/224; 315/307; 315/209 R; 315/DIG. 5
[58] Field of Search ............... 315/224, 307, 315/209 R

[56] References Cited

U.S. PATENT DOCUMENTS

| | | | |
|---|---|---|---|
| 4,901,316 | 2/1990 | Small | 363/98 |
| 5,023,516 | 6/1991 | Ito et al. | 315/101 |
| 5,166,578 | 11/1992 | Nilssen | 315/224 |
| 5,394,062 | 2/1995 | Minarczyk et al. | 315/224 |
| 5,424,616 | 6/1995 | Reijnaerts | 315/224 |

FOREIGN PATENT DOCUMENTS

| | | |
|---|---|---|
| 0294878 | 12/1988 | European Pat. Off. . |
| 909969 | 11/1962 | United Kingdom . |
| 1024128 | 3/1966 | United Kingdom . |
| 2230154 | 10/1990 | United Kingdom . |
| 2264596 | 9/1993 | United Kingdom . |

*Primary Examiner*—Don Wong
*Assistant Examiner*—Wilson Lee
*Attorney, Agent, or Firm*—Renner, Otto, Boisselle & Sklar, P.L.L.

[57] ABSTRACT

The fluorescent lamp lighting apparatus of the present invention includes: a first serial connection including a first switching device and a second switching device which are connected to a power supply circuit; a second serial connection including a first inductor, a first capacitor and a fluorescent lamp which are connected between one terminal of the power supply circuit and an intermediate point of the first and the second switching devices; a third serial connection including a second inductor, a second capacitor and a third inductor which is electromagnetically coupled to the first inductor, the third serial connection supplying a control voltage to a control terminal of the first switching device or a control terminal of the second switching device; and a constant voltage device connected in parallel to the second capacitor. In the fluorescent lamp lighting apparatus, the constant voltage device supplies a positive control voltage and a negative control voltage to the control terminal, the positive control voltage is positive with respect to a cathode terminal corresponding to the control terminal, the negative control voltage is negative with respect to the cathode terminal, and an absolute value of the positive control voltage is larger than an absolute value of the negative control voltage.

4 Claims, 5 Drawing Sheets

FLUORESCENT LAMP LIGHTING APPARATUS

BACKGROUND OF THE INVENTION

1. Field of the Invention

The present invention relates to a fluorescent lamp lighting apparatus. More particularly, the present invention relates to a lighting apparatus for driving a fluorescent lamp by using a plurality of switching devices.

2. Description of the Related Art

Figure 6:
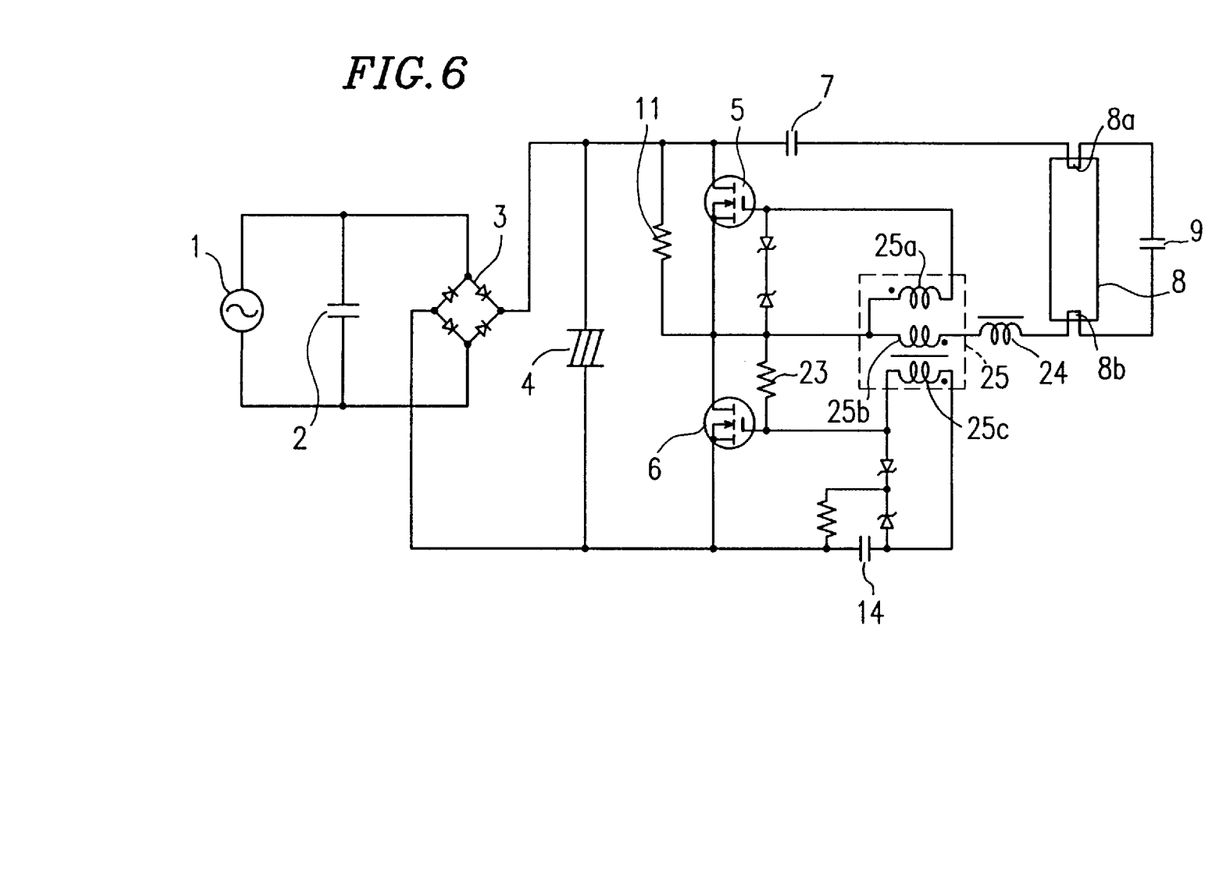
FIG. 6 is a circuit diagram of a prior art fluorescent lamp lighting apparatus.

A so-called "series inverter" shown in FIG. 6 is one example of an exemplary prior art fluorescent lamp lighting apparatus. In the circuit shown in FIG. 6, before a fluorescent lamp 8 is started, current flows from an alternating current (AC) power supply 1 through a rectifier circuit 3. The AC voltage is rectified by the rectifier circuit 3. Thereafter, the voltage is not only charged in a ripple filtering capacitor 4, but also flows through a resistor 11, a resistor 23 and a secondary winding 25c of a current transformer 25 so as to be charged in a trigger capacitor 14. When the voltage of the trigger capacitor 14 reaches the gate threshold voltage of an FET 6, the charge accumulated in the trigger capacitor 14 is applied to the gate of the FET 6 so that the FET 6 is turned ON.

Once the FET 6 is turned ON, the current flows from the AC power supply 1 through the rectifier circuit 3, a resonance capacitor 7, one electrode 8a of the fluorescent lamp 8, a preheat capacitor 9, the other electrode 8b of the fluorescent lamp 8, an inductor 24, a primary winding 25b of the current transformer 25 and the drain of the FET 6, while increasing the amount thereof. Then, the current passes through the rectifier circuit 3 again to return to the AC power supply 1.

Then, a voltage is generated in a secondary winding 25c of the current transformer 25 by the current flowing through the primary winding 25b of the current transformer 25, thereby applying a gate voltage to the FET 6 and keeping the FET 6 turned ON. In the meantime, though the current flowing through the primary winding 25b of the current transformer 25 continuously increases, the magnetic saturation of the core of the current transformer 25 occurs at a certain point in time, when the current transformer 25 loses the function as an inductance.

When the core of the current transformer 25 is magnetically saturated, voltage is no longer output from the secondary winding 25c of the current transformer 25. As a result, the voltage applied between the gate and the source of the FET 6 decreases to the gate threshold voltage thereof or lower, so that the FET 6 is turned OFF.

It should be understood that the output polarity of the secondary winding of the current transformer 25 is inverted when the core of the current transformer 25 is magnetically saturated, because the current caused by the energy stored in the current transformer 25 is current having a variable amount dependent upon time. That is to say, since the voltage applied between the gate and the source of an FET 5 increases, the FET 5 is turned ON soon.

Once the FET 5 is turned ON, the current flows through the resonance capacitor 7, the FET 5, the primary winding 25b of the current transformer 25, the inductor 24, one electrode 8b of the fluorescent lamp 8, the preheat capacitor 9 and the other electrode 8b of the fluorescent lamp 8 so as to return to the resonance capacitor 7. This current resonates in a closed circuit including the resonance capacitor 7, the FET 5, the current transformer 25, the inductor 24, one electrode 8b of the fluorescent lamp 8, the preheat capacitor 9 and the other electrode 8b of the fluorescent lamp 8.

When the core of the current transformer 25 is magnetically saturated again owing to the inversion of the current, voltage is no longer output from a secondary winding 25a of the current transformer 25. As a result, the voltage applied between the gate and the source of the FET 5 decreases to the gate threshold voltage thereof or lower so that the FET 5 is turned OFF. Subsequently, when the output polarity of the secondary winding of the current transformer 25 is inverted, the FET 6 is turned ON again. Such an operation is repeatedly performed thereafter.

The current flows through the electrodes 8a and 8b of the fluorescent lamp 8, thereby heating these electrodes 8a and 8b. In addition, since a voltage having a large amplitude owing to the resonance is simultaneously applied to the electrodes of the fluorescent lamp 8, the temperature of the electrodes rises, thereby lighting the fluorescent lamp 8.

As described above, a prior art fluorescent lamp lighting apparatus uses a current transformer for switching the fluorescent lamp at a radio frequency. However, the use of a current transformer for such a prior art fluorescent lamp lighting apparatus prevents such an apparatus from being downsized. Moreover, since a current transformer is expensive, the fabrication costs of such a lighting apparatus are disadvantageously high.

SUMMARY OF THE INVENTION

The fluorescent lamp lighting apparatus of the present invention includes: a first serial connection including a first switching device and a second switching device which are connected to a power supply circuit; a second serial connection including a first inductor, a first capacitor and a fluorescent lamp which are connected between one terminal of the power supply circuit and an intermediate point of the first and the second switching devices; a third serial connection including a second inductor, a second capacitor and a third inductor which is electromagnetically coupled to the first inductor, the third serial connection supplying a control voltage to a control terminal of the first switching device or a control terminal of the second switching device; and a constant voltage device, connected in parallel to the second capacitor. In the fluorescent lamp lighting apparatus, the constant voltage device supplies a positive control voltage and a negative control voltage to the control terminal, the positive control voltage is positive with respect to a cathode terminal corresponding to the control terminal, the negative control voltage is negative with respect to the cathode terminal, and an absolute value of the positive control voltage is larger than an absolute value of the negative control voltage.

In one embodiment, a resonance frequency of the second inductor and the second capacitor is higher than a frequency at which the first and the second switching devices are switched.

Thus, the invention described herein makes possible the advantage of providing a fluorescent lamp lighting apparatus which can start and light a fluorescent lamp by implementing a downsized, simplified and cost-reduced configuration and without using a current transformer.

This and other advantages of the present invention will become apparent to those skilled in the art upon reading and understanding the following detailed description with reference to the accompanying figures.

DESCRIPTION OF THE PREFERRED EMBODIMENTS

Hereinafter, the embodiments of the present invention will be described with reference to the accompanying drawings.

In this specification, a "control terminal" of a switching device collectively refers to the gate of an FET (field-effect transistor), the base of a bipolar transistor and the gate of an IGBT (insulated-gate bipolar transistor), an "anode terminal" of a switching device collectively refers to the drain of an FET, the collector of a bipolar transistor and the collector of an IGBT and a "cathode terminal" of a switching device collectively refers to the source of an FET, the emitter of a bipolar transistor and the emitter of an IGBT.

EXAMPLE 1

Figure 1:
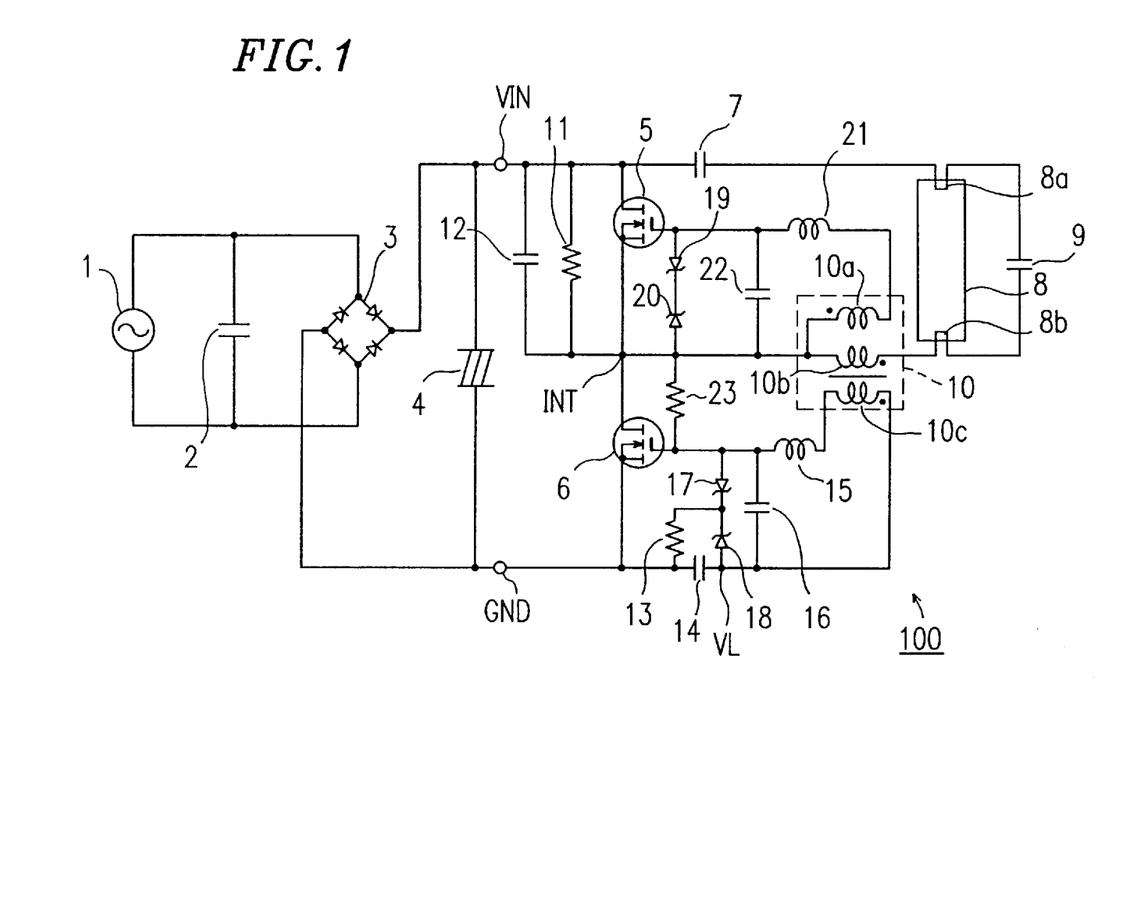
FIG. 1 is a circuit diagram of a fluorescent lamp lighting apparatus in a first example of the present invention.

FIG. 1 is a circuit diagram of a fluorescent lamp lighting apparatus in a first example of the present invention. The fluorescent lamp lighting apparatus 100 receives energy for lighting a fluorescent lamp 8 from an AC power supply 1, for example. The AC power supply 1 is typically an AC outlet and outputs an AC voltage having a root mean square value of 100 V to a rectifier circuit 3. A noise preventing capacitor 2 is provided between the AC power supply 1 and the rectifier circuit 3 to prevent the switching noise generated by the fluorescent lamp lighting apparatus 100 from leaking to the AC power supply 1.

The rectifier circuit 3 receives the alternating current, performs the full-wave rectification thereof and then outputs the ripple current to a ripple filtering capacitor 4. The ripple filtering capacitor 4 receives the full-wave-rectified ripple current and accumulates charge therein, thereby reducing the ripple of the current. As a result, a voltage which has been converted to substantially direct current is generated between a terminal VIN and a terminal GND. When the AC power supply 1 has a root mean square value of 100 V, the voltage at the terminal VIN with respect to the terminal GND becomes about 140 V.

The drain (or the anode terminal) of an FET 5 is connected to the terminal VIN, the source (or the cathode terminal) of the FET 5 is connected to the drain (or the anode terminal) of an FET 6 and the source (or the cathode terminal) of the FET 6 is connected to the terminal GND. That is to say, the FETs 5 and 6 are serially connected to each other.

A resonance capacitor 7, an electrode 8a of the fluorescent lamp 8, a preheat capacitor 9, the other electrode 8b of the fluorescent lamp 8 and a primary winding 10b of a choke coil 10 are serially connected in this order between the terminal VIN and a terminal INT. The terminal INT is an intermediate point between the FETs 5 and 6, i.e., a point at which the source of the FET 5 is connected to the drain of the FET 6. It should be noted that, in this specification, a "terminal" does not always require a physical terminal structure for an external connection. For example, each of the terminals VIN, INT, GND and the like shown in this circuit diagram corresponds to a part of a copper case pattern on a printed circuit board of an actual product.

The fluorescent lamp lighting apparatus 100, including the preheat capacitor 9 provided between the pair of electrodes 8a and 8b of the fluorescent lamp 8, constitutes a radio frequency inverter circuit as a whole. The fluorescent lamp lighting apparatus 100 includes an AC-DC converter circuit or a circuit for converting the alternating current flowing from the AC power supply 1 to the terminals VIN and GND into direct current. However, even an apparatus not including such a circuit falls within the scope of the present invention. For example, a direct current voltage may be received at the terminals VIN and GND by eliminating the AC-DC converter circuit from the fluorescent lamp lighting apparatus 100. In such a case, the received DC current flows through the resonance capacitor 7, the fluorescent lamp 8 and the primary winding 10b which are serially connected to each other via the alternately turning ON FETs 5 and 6, thereby lighting the fluorescent lamp 8.

Hereinafter, a circuit for driving the gates of the FETs 5 and 6 will be described. The choke coil 10 includes a primary winding 10b and two secondary windings 10a and 10c. When the current flows through the primary winding 10b, the secondary windings 10a and 10c respectively generate voltages for driving the gates of the FETs 5 and 6, thereby enabling self oscillation.

The secondary winding 10a and an inductor 21 which are serially connected to each other, a pair of serially connected Zener diodes 19 and 20, and a capacitor 22 are connected in parallel between the gate of the FET 5 and the terminal INT. A resistor 11 and a capacitor 12 are connected in parallel between the drain and the source of the FET 5.

The secondary winding 10c and an inductor 15 which are serially connected, a pair of serially connected Zener diodes 17 and 18, and a capacitor 16 are connected in parallel between the gate of the FET 6 and a terminal VL. A resistor 23 is connected between the gate of the FET 6 and the terminal INT. A trigger capacitor 14 is connected between the terminals VL and GND.

The charge supplied through the terminal VIN is accumulated in the trigger capacitor 14 via the resistors 11 and 23. Conversely, a resistor 13 for discharging the charge accumulated in the trigger capacitor 14 is connected between the intermediate point of the pair of Zener diodes 17 and 18 and the terminal GND.

Figure 2:
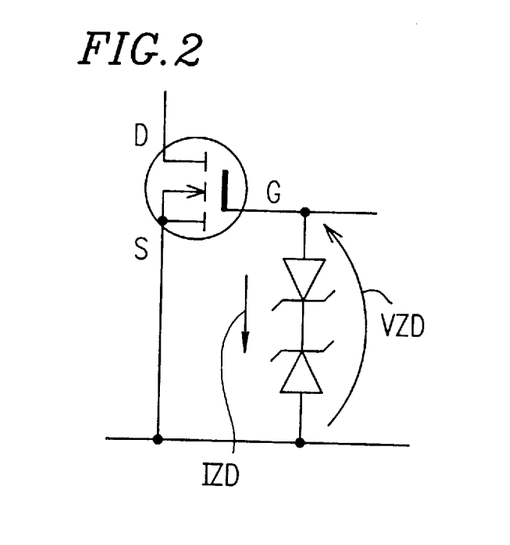
FIG. 2 is a circuit diagram showing a voltage VZD between the two terminals of a pair of serially connected Zener diodes and the direction of the current IZD flowing through the Zener diodes.
Figure 3:
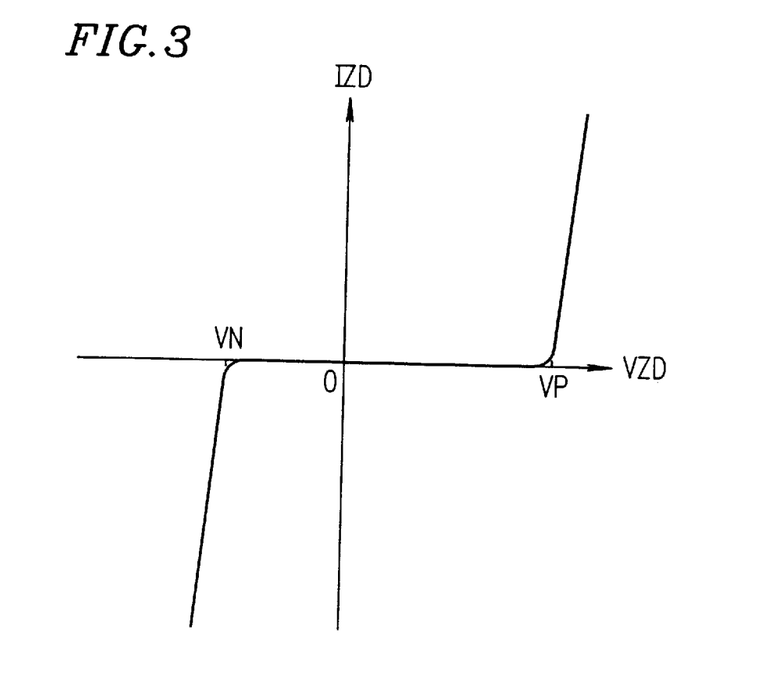
FIG. 3 is a graph representing the characteristics of the serially connected Zener diodes by the relationship between the voltage VZD and the current IZD.

Hereinafter, the pairs of Zener diodes 17, 18 and 19, 20 will be described. FIG. 2 is a circuit diagram showing a voltage VZD between the two terminals of the pair of serially connected Zener diodes and the direction of the current IZD flowing through the Zener diodes. FIG. 3 is a graph representing the characteristics of the serially connected Zener diodes by the relationship between the voltage VZD and the current IZD. When the voltage VZD and the current IZD are defined as shown in FIG. 2, the resistance is substantially infinity in the range from a positive control voltage VP to a negative control voltage VN as shown in FIG. 3. However, once the control voltage exceeds VP or VN, the resistance is substantially zero. Thus, as shown in FIG. 3, the Zener diodes 17 and 18 clip the control voltage to be applied to the gate of the FET 6 at the positive control voltage VP and the negative control voltage VN. In other words, the Zener diodes 17 and 18 apply the positive control voltage VP and the negative control voltage VN to the gate (i.e., the control terminal) of the FET 6. The voltage VP is positive with respect to the source (i.e., the cathode terminal) of the FET 6 and the voltage VN is negative with respect to the source of the FET 6.

In the fluorescent lamp lighting apparatus 100, though the absolute value of the positive control voltage VP may be equal to that of the negative control voltage VN, it is preferable that the absolute value of the positive control voltage VP is larger than that of the negative control voltage VN as will be described later in the second example. Another pair of Zener diodes 19 and 20 have the same characteristics as those of the pair of Zener diodes 17 and 18.

Next, the operation of the fluorescent lamp lighting apparatus 100 will be described. Before the fluorescent lamp 8 is started, the commercial alternating current voltage supplied from the AC power supply 1 (e.g., an AC outlet) passes through the noise preventing capacitor 2, the rectifier circuit 3 and the ripple filtering capacitor 4 so as to be substantially converted into a direct current voltage. The direct current voltage generated between the terminals VIN and GND causes current to flow through the resonance capacitor 7, one electrode 8a of the fluorescent lamp 8, the preheat capacitor 9, the other electrode 8b of the fluorescent lamp 8, the primary winding 10b of the choke coil 10 and the FET 6. As a result, the ripple filtering capacitor 4 is charged up to the peak value (e.g., 140 V) of the voltage supplied by the AC power supply 1. Consequently, the trigger capacitor 14 is charged via the resistors 11 and 23, the inductor 15 and the secondary winding 10c of the choke coil 10.

When the voltage between the two terminals of the trigger capacitor 14 reaches the gate threshold voltage of the FET 6, the charge accumulated in the trigger capacitor 14 is supplied to the gate of the FET 6 so that the FET 6 is turned ON. Once the FET 6 is turned ON, the application of a voltage between the terminals VIN and GND increases the amount of current flowing through the resonance capacitor 7, one electrode 8a of the fluorescent lamp 8, the preheat capacitor 9, the other electrode 8b of the fluorescent lamp 8, the primary winding 10b of the choke coil 10 and the FET 6.

Since the current flows through the primary winding 10b of the choke coil 10, a voltage is generated between the two terminals of the secondary winding 10c of the choke coil 10. As a result, the gate voltage of the FET 6 becomes higher and the FET 6 is kept turned ON.

The current flowing through the secondary winding 10c of the choke coil 10 soon begins to flow in the opposite direction owing to the resonance of the inductor 15 and the capacitor 16, which are connected to the secondary winding 10c. As a result, since the voltage applied between the gate and the source of the FET 6 becomes lower than the gate threshold voltage of the FET 6, the FET 6 is turned OFF.

As shown in FIG. 1, the secondary winding 10a of the choke coil 10 is wound in the opposite direction to that of the secondary winding 10c. Thus, if the voltage between the two terminals of the secondary winding 10c decreases, then the voltage between the two terminals of the secondary winding 10a increases to the contrary. Consequently, after the FET 6 is turned OFF, the voltage applied between the gate and the source of the FET 5 also increases, thereby turning the FET 5 ON.

Once the FET 5 is turned ON, the charge accumulated in the resonance capacitor 7 moves within the closed circuit including the FET 5, the choke coil 10, one electrode 8b of the fluorescent lamp 8, the preheat capacitor 9 and the other electrode 8a of the fluorescent lamp 8. The current resonates in a serial resonance circuit including the primary winding 10b of the choke coil 10, the resonance capacitor 7 and the preheat capacitor 9.

The current flowing through the secondary winding 10a of the choke coil 10 soon begins to flow in the opposite direction owing to the resonance of the inductor 21 and the capacitor 22, which are connected to the secondary winding 10a. As a result, since the voltage applied between the gate and the source of the FET 5 becomes lower than the gate threshold voltage of the FET 5, the FET 5 is turned OFF.

As shown in FIG. 1, the secondary winding 10c of the choke coil 10 is wound in the opposite direction to that of the secondary winding 10a. Thus, if the voltage between the two terminals of the secondary winding 10a decreases, then the voltage between the two terminals of the secondary winding 10c increases to the contrary. Consequently, after the FET 5 is turned OFF, the voltage applied between the gate and the source of the FET 6 also increases, thereby turning the FET 6 ON. From then on, by repeating the above-described operation, the FETs 5 and 6 are alternately turned ON.

The current alternately flowing through the FETs 5 and 6 flows through the electrodes 8a and 8b of the fluorescent lamp 8, thereby heating these electrodes 8a and 8b. In addition, a voltage having a large amplitude owing to the resonance is simultaneously applied to the electrodes 8a and 8b of the fluorescent lamp 8. The fluorescent lamp 8 is lighted and then keeps being continuously lighted because of the heat generated in the electrodes and the high voltage between the electrodes.

In the fluorescent lamp lighting apparatus in the first example of the present invention, the radio frequency drive of the gates of the FETs 5 and 6 functioning as switching devices is realized by the resonance of the inductor 21 and the capacitor 22 and the resonance of the inductor 15 and the capacitor 16, respectively. Therefore, unlike the prior art fluorescent lamp lighting apparatuses, the fluorescent lamp can be started and lighted without using a current transformer. As a result, the present invention can provide a fluorescent lamp lighting apparatus having a downsized, simplified and cost-reduced configuration.

Exemplary circuit constants of the fluorescent lamp lighting apparatus 100 are as follows.
The root mean square value of the output voltage of the AC power supply 1: 100 V,
The inductance of the primary winding 10b: 0.7 mH,
The number of turns of the primary winding 10b: 136 turns,
The number of turns of the secondary winding 10a: 10 turns,
The number of turns of the secondary winding 10c: 10 turns,
The capacitance of the resonance capacitor 7: 0.1 $\mu$F,
The capacitance of the preheat capacitor 9: 9100 pF,
The capacitance of the ripple filtering capacitor 4: 33 $\mu$F,
The capacitance of the trigger capacitor 14: 0.033 $\mu$F and
The Zener voltage of the Zener diodes 17 to 20: 10.0 V (i.e., the positive control voltage VP=+10.0 V and the negative control voltage VN=−10.0 V).

The circuit constants of the fluorescent lamp lighting apparatus in the first example of the present invention are not limited to the above-exemplified values. However, by using these exemplary constants, the lamp can be satisfactorily started and lighted.

It is noted that the resonance frequency of the inductor 15 and the capacitor 16 is preferably higher than the switching frequency of the FETs 5 and 6. For example, the resonance frequency of the inductor 15 and the capacitor 16 is about 100 kHz and the switching frequency of the FETs 5 and 6 is in the range from about 10 kHz to about 75 kHz. The same relationship is also true of the resonance frequency of the inductor 21 and the capacitor 22.

EXAMPLE 2

In the fluorescent lamp lighting apparatus in the second example of the present invention, not only the effects of the first example but also an effect of preventing short-through current with certainty can be attained. The short-through current is current caused when the terminals VIN and GND are short-circuited because of the simultaneous turn ON of the FETs 5 and 6 of the fluorescent lamp lighting apparatus 100. The fluorescent lamp lighting apparatus of the first example has a configuration in which the FETs 5 and 6 are not simultaneously turned ON in theory. However, in actuality, the FETs 5 and 6 may be simultaneously turned ON because of the variation in constants of the circuit components, the temperature characteristics of the components or the like.

Figure 4:
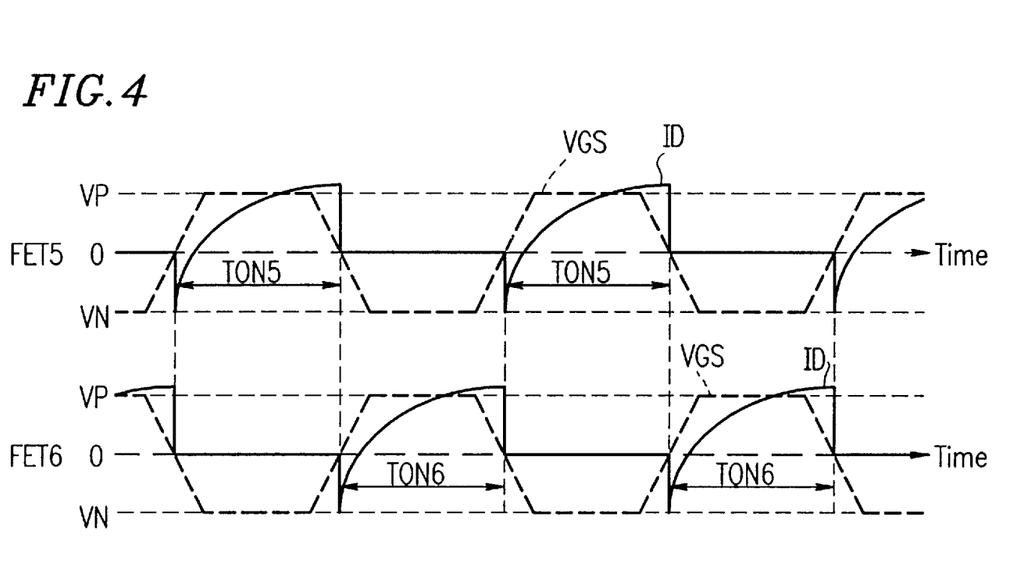
FIG. 4 is a graph showing a gate-source voltage VGS and drain current ID for the FETs 5 and 6 of the first example.

FIG. 4 is a graph showing a gate-source voltage VGS and drain current ID for the FETs 5 and 6 of the first example. In FIG. 4, the axis of the abscissas represents a time, while the axis of the ordinates represents a voltage for the gate-source voltage VGS and current for the drain current ID. In the first example, the absolute value of the positive control voltage VP (e.g., +10.0 V) is equal to that of the negative control voltage VN (e.g., −10.0 V): Thus, as shown in FIG. 4, a so-called "dead time" TD does not exist between the ON time period TON5 of the FET 5 and the ON time period TON6 of the FET 6. In theory, no short-through current flows in the case of the timings shown in FIG. 4. However, in actual products, since some variation occurs in the constants, the temperature characteristics and the like among the circuit components thereof, the ON time periods TON5 and TON6 may overlap with each other on the time axis. In such a case, since there is a time period during which the FETs 5 and 6 are simultaneously ON, the short-through current flows so that a larger amount of power is lost from the FETs 5 and 6. In addition, since the FETs 5 and 6 generate heat, the FETs 5 and 6 are likely to deteriorate sooner than expected.

Figure 5:
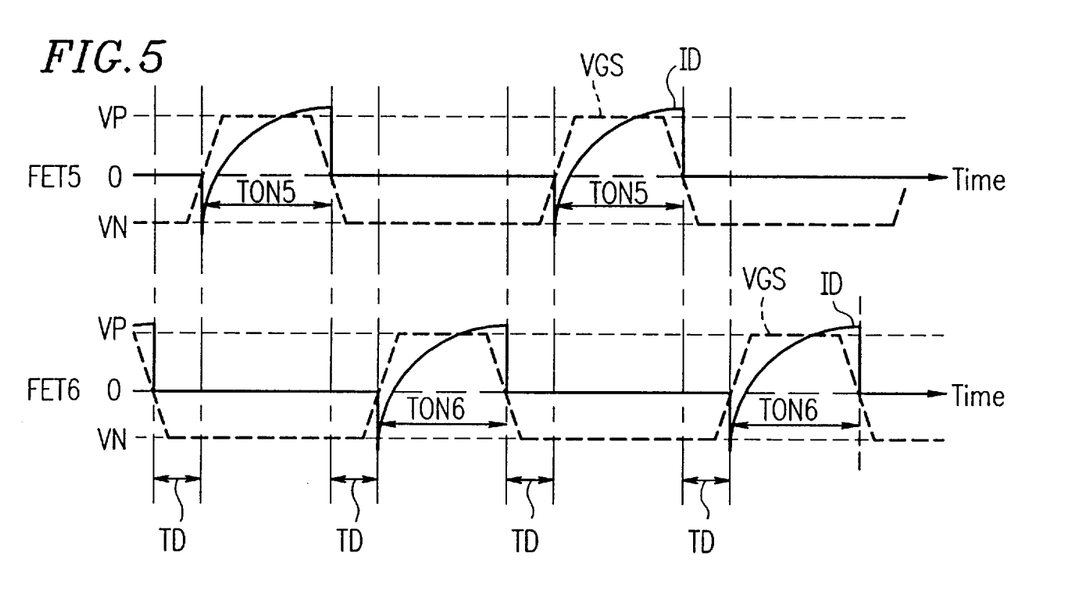
FIG. 5 is a graph showing a gate-source voltage VGS and drain current ID for the FETs 5 and 6 of the second example.

FIG. 5 is a graph showing a gate-source voltage VGS and drain current ID for the FETs 5 and 6 of the second example. In FIG. 5, the axis of the abscissas represents a time, while the axis of the ordinates represents a voltage for the gate-source voltage VGS and current for the drain current ID. In the second example, the absolute value of the positive control voltage VP (e.g., +10.0 V) is larger than that of the negative control voltage VN (e.g., −8.2 V). Thus, as shown in FIG. 5, a so-called "dead time" TD exists between the ON time period TON5 of the FET 5 and the ON time period TON6 of the FET 6.

In the second example, the absolute value of the positive control voltage VP is larger than that of the negative control voltage VN. In other words, though the fluorescent lamp lighting apparatus of the second example has the same circuit configuration as that of the fluorescent lamp lighting apparatus 100 of the first example, the Zener voltages V17 to V20 of the Zener diodes 17 to 20 satisfy the relationships: V17<V18 and V19<V20. By setting the Zener voltages of the Zener diodes 17 to 20 so as to satisfy the above relationships, the dead times TD shown in FIG. 5 can be provided. That is to say, the simultaneous turn ON of the FETs 5 and 6 can be prevented with certainty.

As described above, in the second example, since the simultaneous turn ON of the two switching devices can be prevented, it is possible to prevent the characteristics of the switching devices from being deteriorated sooner than expected.

The circuit constants in the second example are the same as those of the first example except for those of the Zener diodes. Exemplary constants are as follows.

The root mean square value of the output voltage of the AC power supply 1: 100 V,
The inductance of the primary winding 10b: 0.7 mH,
The number of turns of the primary winding 10b: 136 turns,
The number of turns of the secondary winding 10a: 10 turns,
The number of turns of the secondary winding 10c: 10 turns,
The capacitance of the resonance capacitor 7: 0.1 μF,
The capacitance of the preheat capacitor 9: 9100 pF,
The capacitance of the ripple filtering capacitor 4: 33 μF,
The capacitance of the trigger capacitor 14: 0.033 μF,
The Zener voltage of the Zener diodes 17 and 19: 8.2 V (i.e., the negative control voltage VN=−8.2 V).
The Zener voltage of the Zener diodes 18 and 20: 10.0 V (i.e., the positive control voltage VP=+10.0 V).

The circuit constants of the fluorescent lamp lighting apparatus in the second example of the present invention are not limited to the above-exemplified values. However, by using these exemplary constants, the lamp can be satisfactorily started and lighted and the short-through current can be prevented with certainty.

In the foregoing first and second examples, an FET is used as a switching device having a control terminal. However, even when any of other switching devices having a control terminal such as bipolar transistors and IGBTs is used, the same effects can also be attained. Moreover, though a series inverter is used as a lighting circuit, the same effects can also be attained even by the use of any other circuit having a different configuration such as a single-transistor inverter so long as a switching device having a control terminal is driven by an LC resonance. Furthermore, though the preheat capacitor 9 is provided for the fluorescent lamp 8 so as to be more distant from the power supply, the same effects can also be attained if the preheat capacitor 9 is provided to be nearer to the power supply.

As is apparent from the foregoing description, the present invention can provide a fluorescent lamp lighting apparatus having a downsized, simplified and cost-reduced configuration without using a current transformer.

Furthermore, according to the present invention, a pair of switching devices can be driven such that the ON time periods of the two switching devices do not overlap with each other on the time axis. Thus, the present invention can provide a downsized, simplified and cost-reduced fluorescent lamp lighting apparatus which can prevent the switching devices from being simultaneously turned ON, suppress the loss in the switching devices, and prevent the components of the switching devices from being deteriorated sooner than expected because of the heat generated by the switching devices.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:
1. A fluorescent lamp lighting apparatus comprising:
 a first serial connection comprising a first switching device and a second switching device which are connected to a power supply circuit;
 a second serial connection comprising a first inductor, a first capacitor and a fluorescent lamp which are con- nected between one terminal of the power supply circuit and an intermediate point of the first and the second switching devices;

a third serial connection comprising a second inductor, a second capacitor and a third inductor which is electromagnetically coupled to the first inductor, the third serial connection supplying a control voltage to a control terminal of the first switching device or a control terminal of the second switching device; and a constant voltage device connected in parallel to the second capacitor, wherein the constant voltage device supplies a positive control voltage and a negative control voltage to the control terminal, the positive control voltage is positive with respect to a cathode terminal corresponding to the control terminal, the negative control voltage is negative with respect to the cathode terminal, and an absolute value of the positive control voltage is larger than an absolute value of the negative control voltage.

2. A fluorescent lamp lighting apparatus according to claim 1, wherein a resonance frequency of the second inductor and the second capacitor is higher than a frequency at which the first and the second switching devices are switched.

3. A fluorescent lamp lighting apparatus according to claim 1, wherein the third serial connection supplies a voltage of the second capacitor stored by an induced current generated in the third inductor as the control voltage.

4. A fluorescent lamp lighting apparatus according to claim 1, wherein the constant voltage device limits a voltage of the second capacitor to form the control voltage.

* * * * *